United States Patent
Swei et al.

(10) Patent No.: US 8,726,611 B2
(45) Date of Patent: May 20, 2014

(54) METHOD OF INSTALLING A ROOFING MEMBRANE

(75) Inventors: Gwo S. Swei, Vandalia, OH (US);
Maryann C. Kenney, Foxboro, MA (US); Ricky Santoso, Shrewsbury, MA (US); Charles Hayden, Nashua, MA (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 1103 days.

(21) Appl. No.: 12/646,816

(22) Filed: Dec. 23, 2009

(65) Prior Publication Data
US 2010/0162657 A1   Jul. 1, 2010

Related U.S. Application Data

(60) Provisional application No. 61/141,510, filed on Dec. 30, 2008.

(51) Int. Cl.
*E04B 1/62* (2006.01)
*E04D 5/14* (2006.01)
*E04D 5/06* (2006.01)
*E04D 11/02* (2006.01)

(52) U.S. Cl.
CPC *E04D 5/148* (2013.01); *E04D 5/06* (2013.01); *E04D 11/02* (2013.01)
USPC .... 52/746.11; 520/105; 520/409; 520/745.06

(58) Field of Classification Search
USPC .............. 52/746.1, 746.11, 105, 169.14, 409, 52/411, 745.05, 745.06; 405/129.45, 405/129.75; 156/71
See application file for complete search history.

(56) References Cited

U.S. PATENT DOCUMENTS

| | | | |
|---|---|---|---|
| 4,910,059 A | 3/1990 | Sancaktar | |
| 4,916,871 A * | 4/1990 | Anderson | 52/98 |
| 6,004,645 A | 12/1999 | Hubbard | |
| 6,238,502 B1 | 5/2001 | Hubbard | |
| 6,455,171 B2 | 9/2002 | Scheibelhoffer et al. | |
| 6,524,686 B2 | 2/2003 | Strassel | |
| 6,536,498 B1 | 3/2003 | Srinivasan et al. | |

(Continued)

FOREIGN PATENT DOCUMENTS

| EP | 1225265 A1 | 7/2002 |
|---|---|---|
| EP | 01198339 B1 | 10/2003 |

(Continued)

OTHER PUBLICATIONS

International Search Report from PCT Application No. PCT/US2009/069503 dated May 25, 2010, 1 pg.

*Primary Examiner* — William Gilbert
(74) *Attorney, Agent, or Firm* — Abel Law Group, LLP; Chi Suk Kim

(57) ABSTRACT

A roofing membrane includes first and second layers. The first layer includes a low surface energy polymer. A method of installing the roofing membrane includes, along an edge of a first membrane, mechanically removing a portion of the first membrane extending vertically to include the first layer and a portion of the second layer to leave a flap of the first membrane, placing an edge of a second membrane to overlap the first membrane, and bonding the first membrane to the second membrane. The underside of the edge of the second membrane overlies the flap of the first membrane.

17 Claims, 5 Drawing Sheets

(56) References Cited

U.S. PATENT DOCUMENTS

| | | |
|---|---|---|
| 6,544,596 B2 | 4/2003 | Clemens et al. |
| 6,607,793 B2 | 8/2003 | Hubbard et al. |
| 6,644,371 B2 | 11/2003 | Zurmuehle et al. |
| 6,773,526 B2 * | 8/2004 | Phillips et al. .................. 156/71 |
| 6,811,859 B2 | 11/2004 | Bonnet et al. |
| 6,849,338 B2 | 2/2005 | Clemens et al. |
| 6,866,732 B2 | 3/2005 | Hubbard et al. |
| 6,946,182 B1 | 9/2005 | Allgeuer et al. |
| 7,069,698 B2 | 7/2006 | Nee |
| 7,356,946 B2 | 4/2008 | Hannon et al. |
| 7,368,155 B2 | 5/2008 | Larson et al. |
| 2001/0051256 A1 | 12/2001 | Silagy et al. |
| 2003/0219568 A1 | 11/2003 | Nee |
| 2004/0127614 A1 | 7/2004 | Jiang et al. |
| 2004/0191508 A1 | 9/2004 | Hubbard et al. |
| 2005/0069710 A1 | 3/2005 | Bonnet et al. |
| 2005/0081281 A1 * | 4/2005 | Hannon et al. .................... 2/275 |
| 2005/0115162 A1 | 6/2005 | Nee |
| 2007/0068721 A1 | 3/2007 | Browne et al. |
| 2007/0137777 A1 * | 6/2007 | Kalwara ........................ 156/247 |
| 2007/0186505 A1 | 8/2007 | Hubbard et al. |
| 2007/0207186 A1 | 9/2007 | Scanlon et al. |
| 2007/0228703 A1 | 10/2007 | Breed |
| 2007/0272341 A1 | 11/2007 | Khan et al. |
| 2007/0277450 A1 | 12/2007 | Raulie |
| 2008/0145652 A1 | 6/2008 | Bonnet et al. |
| 2009/0117367 A1 * | 5/2009 | Stone et al. ................ 428/315.5 |

FOREIGN PATENT DOCUMENTS

| | | |
|---|---|---|
| EP | 01408058 A1 | 4/2004 |
| EP | 01541337 A1 | 6/2005 |
| EP | 01541338 A1 | 6/2005 |
| EP | 01541338 B1 | 5/2007 |
| JP | 57-089610 U | 6/1982 |
| JP | 62-050551 A | 3/1987 |
| JP | 10-044699 A | 2/1998 |
| JP | 2001-248270 | 9/2001 |
| JP | 2004-316152 A | 11/2004 |
| JP | 2005-344509 A | 12/2005 |
| JP | 2006-112031 A | 4/2006 |
| JP | 2006104658 | 4/2006 |
| WO | 9964240 A1 | 12/1999 |
| WO | 0244026 A1 | 6/2002 |
| WO | 03093604 A1 | 11/2003 |
| WO | 2005108442 A1 | 11/2005 |
| WO | 2006065325 A2 | 6/2006 |
| WO | 2007098019 A2 | 8/2007 |
| WO | 2007143579 A2 | 12/2007 |
| WO | WO2008019004 A | 2/2008 |
| WO | 2008109325 A1 | 9/2008 |

* cited by examiner

US 8,726,611 B2

METHOD OF INSTALLING A ROOFING MEMBRANE

CROSS-REFERENCE TO RELATED APPLICATION(S)

The present application claims priority from U.S. Provisional Patent Application No. 61/141,510, filed Dec. 30, 2008, entitled "METHOD OF INSTALLING A ROOFING MEMBRANE," naming inventors Gwo Swei, Maryann Kenney, Ricky Santoso, and Charles Hayden, which application is incorporated by reference herein in its entirety.

FIELD OF THE DISCLOSURE

This disclosure, in general, relates to methods of installing roofing membranes.

BACKGROUND

With increasing energy prices and environmental concerns, industry is turning to new roofing technologies that offer energy savings while providing protection from the weather. Particularly in urban areas with population growth, increased industrialization, and new reliance on power hungry technologies, local governments are increasingly introducing regulations to reduce strain on utility infrastructure. In addition, in response to concern over global and urban warming, cities and municipalities are turning to building code regulation, specifying roofing materials that are less likely to convert sunlight into heat. As such, the building industry and roofing manufacturers are turning to lighter color roofing materials formed of low emission materials. Even further, local governments are regulating the emission of volatile organic chemicals, which frequently evolve from traditional roofing materials.

While lighter colored roofing can initially provide some benefit in turns of energy savings and low heat production, such performance often degrades over time as a result of dirt build up or surface discoloring. Accordingly, the roofing materials industry has turned to low surface energy coatings or films on roofing membranes. While such low surface energy coatings or films prevent dirt and grime build up on the roofing membrane, such low surface energy coatings also prevent adhesion of adjacent roofing membranes, making installation difficult.

Poor adhesion of roofing membranes to adjacent membranes or joints leads to openings within seams that permit water, water vapor, or ice to enter the seam and possibly the structure. Over time, such water, water vapor, or ice, as it cycles through temperature changes, causes damage to the membrane, ultimately leading to a failure that can result in a flooding of the facility over which the roofing membrane is installed. As such, industry has been hesitant to utilize new roofing materials, citing concern over long term performance of such materials.

Accordingly, a new method of installing low surface energy roofing materials would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

In a particular embodiment, a method for installing a roofing membrane includes removing a strip of material along an edge of a roofing membrane. The roofing membrane includes a first layer overlying a second layer. The first layer includes a fluoropolymer. The strip includes the first layer and at least a portion of the second layer. A flap resulting from the removal of the strip includes an exposed portion of the second layer. The method further includes laying a portion of a second roofing membrane over the exposed flap of the first membrane and bonding the second roofing membrane to the first roofing membrane. In an example, bonding includes thermally bonding. In a further embodiment, the method includes removing a second strip of material including a portion of a second layer of a second membrane along the edge of the second membrane to leave an exposed flap that includes a first layer of fluoropolymer and a portion of a second layer. The flap of the second membrane can be placed over the flap of the first roofing membrane. The second flap is bonded to the first flap.

Figure 1:
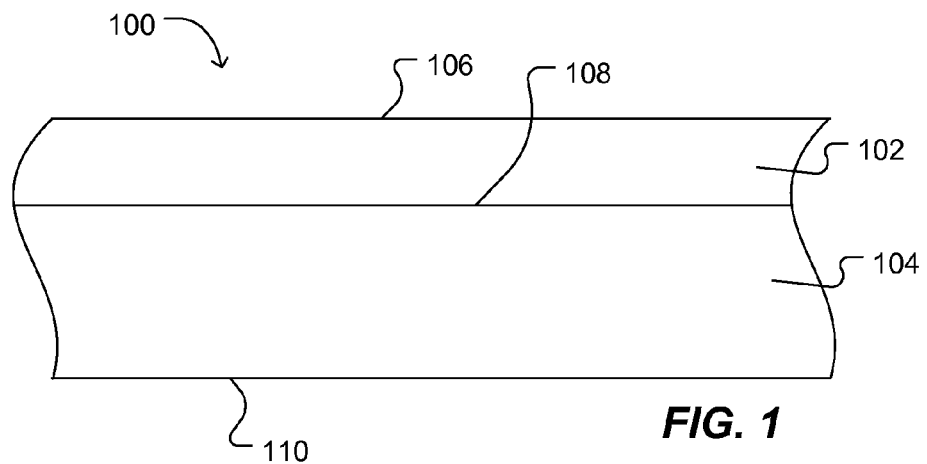
FIG. 1 and FIG. 2 include illustrations of an exemplary roofing membrane.

As illustrated in FIG. 1, a roofing membrane 100 includes a first layer 102 overlying a second layer 104. While only two layers are illustrated, the roofing membrane 100 can include two or more layers. As illustrated, layer 102 forms an exposed or weatherable outer surface 106 of the roofing membrane. The layer 104 forms an underside surface 110 configured to contact a structure. Layer 102 can be bonded to layer 104 at a surface 108. In an example, layer 102 is directly bonded to the layer 104 without any intervening layers. Alternatively, layer 102 can be bonded to layer 104 using an adhesive. In a particular example, the first layer 102 is a capping film, which can be of single or multilayer construction, and the second layer 104 can be formed of an elastomeric, thermoplastic, or asphaltic material, which also can be of single or multilayer construction.

Layer 102 includes a low surface energy material. For example, a low surface energy polymer can be used to form a low surface energy surface. An exemplary low energy surface has a surface energy of less than 29 dynes/cm, such as not greater than 28 dynes/cm, or even not greater than 25.0 dynes/cm. In particular, the surface energy can be as low as 18 dynes/cm or lower. In an example, a low surface energy polymer includes a fluoropolymer. An exemplary fluoropolymer can be formed of a homopolymer, copolymer, terpolymer, or polymer blend formed from a fully or partially fluorinated monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. An exemplary fluoropolymer includes a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), ethylene-perfluoroethylenepropene copolymer (EFEP), polytetrafluoroethylene polymer (PTFE), polyvinyl fluoride (PVF), a terpolymer of tetrafluoroethylene, hexafluoropropylene, and ethylene (HTE), or any blend or any alloy thereof. For example, the fluoropolymer can include FEP. In a further example, the fluoropolymer can include PVDF. In an exemplary embodiment, the fluoropolymer can be crosslinkable through radiation, such as e-beam. An exemplary crosslinkable fluoropolymer can include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers described herein can be obtained from Daikin (Japan) and DuPont (USA). In particular, FEP fluoropolymers, such as NP-12X, are commercially available from Daikin.

In a particular embodiment, the layer 102 includes a blend of a fluoropolymer, such as PVDF, and a second polymer. For example, the fluoropolymer can be a polyvinylidene fluoride (PVDF) homopolymer or a PVDF copolymer, such as vinylidene fluoride/hexafluoropropylene copolymer. Exemplary PVDF polymers include PVDF 1010 and PVDF 21510 by Solvay or Kynar or Kynar Flex polymers available from Arkema. It is contemplated that the fluoropolymer component of the layer 102 can include a melt blend of multiple fluoropolymers in place of one such polymer. Alloys of PVDF homopolymer and PVDF copolymer can provide the film with improved elastic modulus and flexibility.

The second polymer can exhibit resistance to volatile organic components of bitumen or asphalt. An exemplary second polymer includes acrylic polymer, polyvinyl acetate, polyvinylidene chloride, polyacrylonitrile, and cellulosic polymers, or any combination thereof. In particular, the second polymer may, for example, be an acrylic polymer. In an example, the acrylic polymer can be a branched acrylic polymer. In another example, the acrylic polymer can be a linear acrylic polymer. The acrylic polymer can be derived from an alkyl group having from 1-4 carbon atoms, a glycidyl group or a hydroxyalkyl group having from 1-4 carbon atoms, or any combination thereof. A representative acrylic polymer can include polymethyl methacrylate, polyethyl methacrylate, polybutyl methacrylate, polyglycidyl methacrylate, polyhydroxyethyl methacrylate, polymethyl acrylate, polyethyl acrylate, polybutyl acrylate, polyglycidyl acrylate, polyhydroxyethyl acrylate, or any combination thereof.

In a further example, the acrylic polymer is an impact grade or impact modified acrylic. Impact-modified acrylic polymers generally comprise a copolymer of monomers of acrylic monomers with an effective amount of suitable comonomer or graft moiety to produce the desired elastic modulus and impact resistance. An acrylic elastomer, sometimes referred to as acrylate rubber, polyacrylate rubber, polyacrylic elastomer or "ACM" and which is a composition based on a mixture of a polyacrylate and polymethacrylate, a polyacrylate and ethylene methacrylate copolymer ("EMAC"), or a polyacrylate and ethylene butylacrylate ("EBAC"), can be used. Alternatively, a thermoplastic impact-modified acrylic polymer can be a blend of a clear glassy acrylic polymer, such as a plastic copolymer of ethylene and a carboxylic acid compound selected from acrylic acid, methacrylic acid or any combination thereof, with at least one elastomeric component.

The impact-modified acrylic polymer generally includes fine particles of the elastomer dispersed uniformly in the plastic copolymer. The impact grade acrylic can comprise transparent toughened thermoplastic blends prepared by blending 10 to 99 weight percent of a block copolymer; 0.1 to 1.0 weight percent of particulate rubber having a particle size from 0.1 to 10 microns; and the balance a clear glassy polymer.

Another suitable technique for making impact-modified acrylic polymer employs the use of a so-called "core/shell" product, such as Atofina DR-101 resin. These generally are polymer particles that have a central core of one polymer surrounded by a shell of another polymer. The core can be either the plastic or elastomer component and the shell is the opposite, i.e., elastomer or plastic component. The core/shell particles are fed to a melt mixing apparatus, such as a melt extruder in which the core and shell domains are blended in the melt phase to form a homogeneous blend on a much smaller scale and a film is formed from the extrudate of this homogeneous blend.

In an example, the layer 102 includes at least about 70 wt % fluoropolymer, such as at least about 75 wt %, or even at least about 80 wt % fluoropolymer. In a particular example, the layer 102 is formed substantially entirely of fluoropolymer, such as including 100% fluoropolymer. Alternatively, the layer 102 can include a pigment, a UV absorber, or another additive described below, or any combination thereof.

In an exemplary embodiment, the layer 102 has a thickness not greater than about 100 micrometers. For example, the thickness of the layer 102 can be not greater than about 50 micrometers, such as not greater than about 25 micrometers, or even, not greater than about 12 micrometers. While the layer 102 is illustrated as a single layer construction, the layer 102 can include additional layers to enhance mechanical properties, improve adhesion to the layer 104, or to improve processability.

Layer 104 can include an elastomeric material. Particular materials useful in forming the layer 104 have a surface energy of at least 29 dynes/cm, such as at least 31 dynes/cm, or even at least 35 dynes/cm. In particular, the elastomeric material can be a thermoplastic material, a thermoplastic vulcanate, or a thermoset elastomer. For example, an elastomeric material can include a polyolefin or a diene elastomer. An example of the elastomeric material includes a polyolefin homopolymer, such as polyethylene, polypropylene, polybutene, polypentene, or polymethylpentene; a polyolefin copolymer, such as ethylene-propylene copolymer, ethylene-butene copolymer, or ethylene-octene copolymer; a diene elastomer, such as an ethylene propylene diene monomer (EPDM) elastomer; a thermoplastic olefin (TPO); or any blend or combination thereof. An exemplary polyethylene includes high density polyethylene (HDPE), medium density polyethylene (MDPE), low density polyethylene (LDPE), ultra low density polyethylene, or any combination thereof. In a particular example, the elastomeric material includes a thermoplastic olefin (TPO).

In a particular embodiment, the layer 104, for example, can be formed of an elastomeric material, such as a crosslinkable elastomeric polymer. For example, the layer 104 can include a diene elastomer. In a particular example, the elastomeric material includes a blend of a diene elastomer and a polyolefin. In an exemplary embodiment, the diene elastomer is a copolymer formed from at least one diene monomer. For example, the diene elastomer can be a copolymer of ethylene, propylene and diene monomer (EPDM). An exemplary diene monomer includes a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo(5,2,1,0$^2$,6)-deca-3,8-diene or the like; or any combination thereof. In a particular embodiment, the diene includes a non-conjugated diene. In another embodiment, the diene elastomer includes alkenyl norbornene. The diene elastomer can include, for example, ethylene from about 63 wt % to about 95 wt % of the polymer, propylene from about 5 wt % to about 37 wt %, and the diene monomer from about 0.2 wt % to about 15 wt %, based upon the total weight of the diene elastomer. In a particular example, the ethylene content is from about 70 wt % to about 90 wt %, propylene from about 17 wt % to about 31 wt %, and the diene monomer from about 2 wt % to about 10 wt % of the diene elastomer. Prior to crosslinking, the diene elastomer can have a green tensile strength of about 800 psi to about 1,800 psi, such as about 900 psi to about 1,600 psi. The uncrosslinked diene elastomer can have an elongation at break of at least about 600 percent. In general, the diene elastomer includes a small amount of a diene monomer, such as a dicyclopentadiene, an ethylnorbornene, a methylnorbornene, a non-conjugated hexadiene, or the like, and typically has a number average molecular weight of from about 50,000 to about 100,000. Exemplary diene elastomers are commercially available under the tradename Nordel from Dow.

In a particular embodiment, the material of layer 104 includes greater than about 40 wt % of the diene elastomer. For example, the layer 104 can include greater than about 50 wt % diene elastomer, such as greater than about 65 wt %, greater than about 80 wt %, or even, greater than about 90 wt % of the diene elastomer. In a particular example, the material of layer 104 consists essentially of a diene elastomer, such as EPDM.

In an exemplary embodiment in which layer 104 includes a polyolefin or a blend of EPDM and polyolefin, the polyolefin can include a homopolymer, a copolymer, a terpolymer, an alloy, or any combination thereof formed from a monomer, such as ethylene, propylene, butene, pentene, methyl pentene, octene, or any combination thereof. An exemplary polyolefin includes high density polyethylene (HDPE), medium density polyethylene (MDPE), low density polyethylene (LDPE), ultra low density polyethylene, ethylene propylene copolymer, ethylene butene copolymer, polypropylene (PP), polybutene, polypentene, polymethylpentene, polystyrene, ethylene propylene rubber (EPR), ethylene octene copolymer, or any combination thereof. In a particular example, the polyolefin includes high density polyethylene. In another example, the polyolefin includes polypropylene. In a further example, the polyolefin includes ethylene octene copolymer. In a particular embodiment, the polyolefin is not a modified polyolefin, such as a carboxylic functional group modified polyolefin, and in particular, is not ethylene vinyl acetate. An exemplary commercially available polyolefin includes Equistar 8540, an ethylene octene copolymer; Equistar GA-502-024, an LLDPE; Dow DMDA-8904NT 7, an HDPE; Basell Pro-Fax SR275M, a random polypropylene copolymer; Dow 7C50, a block PP copolymer; or products formerly sold under the tradename Engage by Dupont Dow. Another exemplary resin includes Exxon Mobil Exact 0201 or Dow Versify 2300.

In an example, the blend of EPDM and polyolefin can include not greater than about 40 wt % polyolefin, such as not greater than about 30 wt % polyolefin. For example, the blend can include not greater than about 20 wt % of the polyolefin, such as not greater than 10 wt %. In a particular example, the blend includes about 5 wt % to about 30 wt %, such as about 10 wt % to about 30 wt %, about 10 wt % to about 25 wt %, or about 10 wt % to about 20 wt % of the polyolefin. Alternatively, the layer 104 can include at least 60 wt % polyolefin, such as at least 75 wt %, at least 85 wt %, or even at least 95 wt % polyolefin. In a particular example, the layer 104 includes 100 wt % polyolefin as the polymer component in addition to additives and fillers.

In general, the blend of EPDM and polyolefin exhibits compatibility between the polymeric components. DMA analysis can provide evidence of compatibility. DMA analysis can show a single tan delta peak between glass transition temperatures of major components of a blend, indicating compatibility. Alternatively, an incompatible blend can exhibit more than one tan delta peak. In an example, the blend can exhibit a single tan delta peak. In particular, the single tan delta peak can be between the glass transition temperature of the polyolefin and the glass transition temperature of the diene elastomer.

In an exemplary embodiment, the material of layer 104 can be cured through cross-linking. In a particular example, the elastomeric material can be crosslinkable through radiation, such as using x-ray radiation, gamma radiation, ultraviolet electromagnetic radiation, visible light radiation, electron beam (e-beam) radiation, or any combination thereof. Ultraviolet (UV) radiation can include radiation at a wavelength or a plurality of wavelengths in the range of from 170 nm to 400 nm, such as in the range of 170 nm to 220 nm. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator or an electron-accelerator. In an alternative embodiment, the elastomeric material can be crosslinkable through thermal methods. In a further example, the elastomeric material can be crosslinkable through chemical reaction, such as a reaction between a silane crosslinking agent and water.

In another embodiment, layer 104 can include asphaltic material, such as bitumen or modified bitumen. For example, the bitumen can include heavy hydrocarbons. In particular, the bitumen can be modified, such as through blending with an elastomeric polymer or a thermoplastic polymer. For example, the material of the layer 104 can include a polymer modifier, such as atactic polypropylene, amorphous poly alpha-olefin, thermoplastic polyolefin, styrene-butadiene-styrene (SBS), styrene-ethylene-butadiene-styrene (SEBS), acrylonitrile-styrene-butadiene (ABS), other modifiers, or any combination thereof. For example, the bitumen can be an elastomer-modified bitumen, such as an SBS-modified bitumen, an ABS-modified bitumen, or an SEBS-modified bitumen. In another example, the bitumen can be a thermoplastic-modified bitumen, such as an atactic polypropylene-modified bitumen. The layer 104 can include at least about 20% by weight of bitumen or asphalt, such as about 45% to about 90% by weight, or about 45% to about 75% by weight of the bitumen or asphalt. Further, the layer 104 can include about 5% to about 80% by weight of a polymer modifier, such as about 5% to about 40% of the polymer modifier. Alternatively, the asphaltic material can consist essentially of bitumen or asphalt and be free of polymer modifier influencing the mechanical properties of the asphaltic material. The layer 104 can include at least 90% by weight bitumen or asphalt, such as including approximately 100% bitumen or asphalt.

In an exemplary embodiment, the material of layer 104 can include a crosslinking agent, a photoinitiator, a thermal initiator, a filler, a pigment, an antioxidant, a flame retardant, a plasticizer, or any combination thereof. Alternatively, the layer 104 can be free of crosslinking agents, photoinitiators, thermal initiators, fillers, pigments, antioxidants, flame retardants, or plasticizers. In particular, the layer 104 can be free of photoinitiators or crosslinking agents.

The material of the layer 104 can include a filler. An exemplary filler can include talc, calcium carbonate, glass fibers, marble dust, cement dust, clay feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres, chalk, reflective filler such as metal flakes, or any combination thereof. In particular example, the fillers also can act as pigment. For example, the pigment can be an aluminous material, such as alumina or a hydrate of alumina. An alternative example of a filler includes a carbonaceous filler, such as carbon black or graphite. The filler or pigment can be employed in amounts from about 1 wt % to about 90 wt %, such as about 1 wt % to about 80 wt %, or even about 1 wt % to about 40 wt % of the material of the layer 104.

The layer 104 can have a thickness not greater than about 10 millimeters (mm), such as not greater than about 5 mm, or even not greater than about 2 mm. In a particular example, the layer 104 is not greater than about 1.5 mm, such as not greater than about 1.25 mm, or even not greater than about 1.15 mm.

In an exemplary embodiment, the layer 102 and the layer 104 can be bonded directly to and directly contacting each other. For example, the layer 102 and the layer 104 can be coextruded so as to directly contact each other without intervening layers. The layer 104 can be cured or cross-linked, improving the bond between the layer 102 and 104. Alternatively, the layer 102 and the layer 104 can be bonded with an adhesive layer (not illustrated) or thermal lamination.

Figure 2:
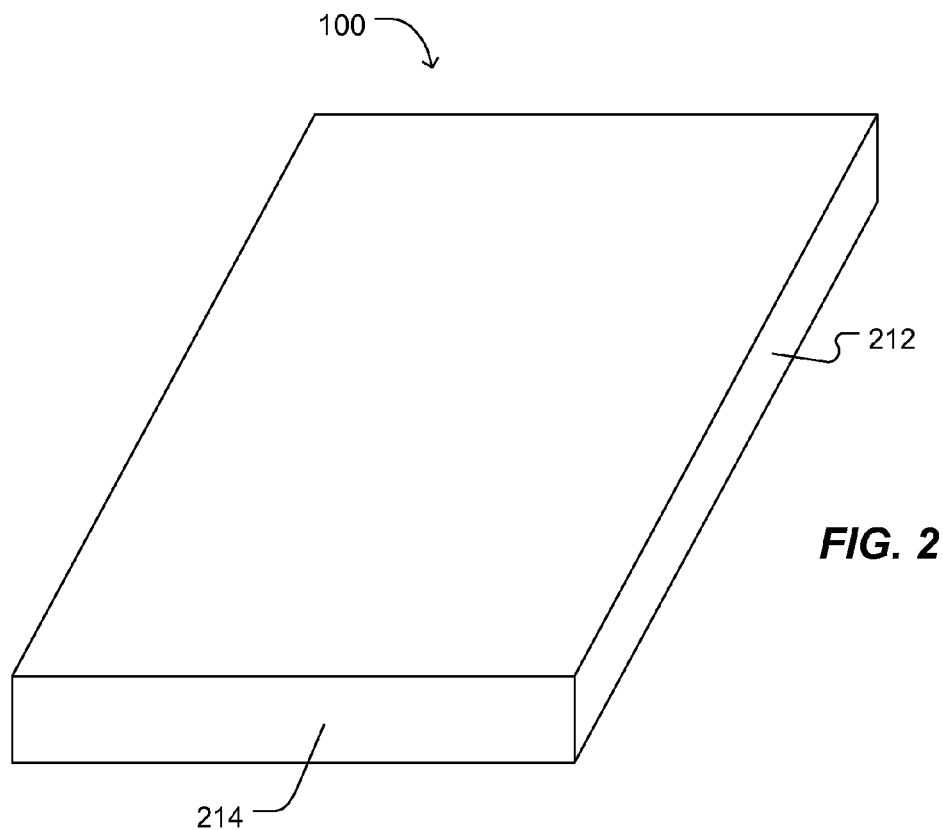

As illustrated in FIG. 2, roofing membrane 100 forms a generally flat sheet including a longitudinal edge 212 and a latitudinal edge 214. In general, a length along the longitudinal edge 212 is greater than a length along the latitudinal edge 214. In a particular example, a ratio of the longitudinal edge 212 to the latitudinal edge 214 is at least about 2, such as at least about 4, at least about 8, at least about 16, or even at least about 32.

To facilitate installation of such a membrane, the membrane 100 is often rolled over the surface of a structure. In an example, an adhesive is placed between the roofing membrane 100 and the structure. Alternatively, the roofing membrane can be heat bondable to the surface of the structure. In another example, the membrane 100 can be mechanically secured to the structure.

Figure 3:
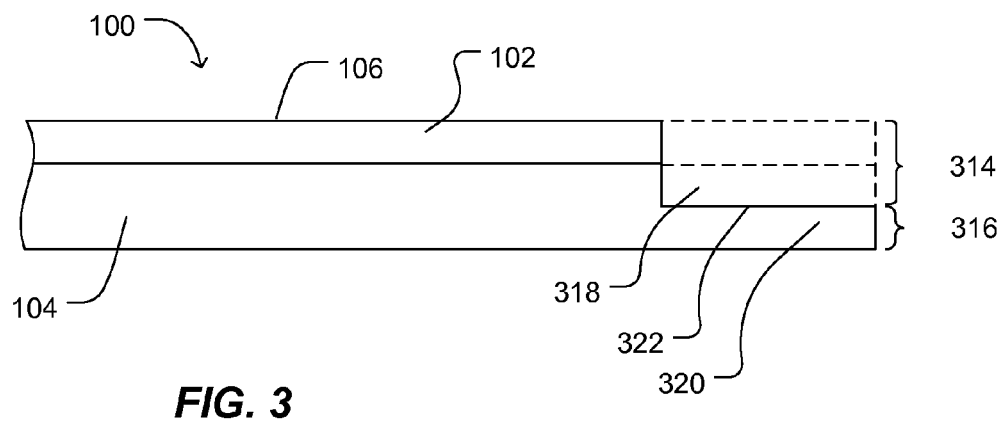
FIG. 3 and FIG. 4 include illustrations of a roofing membrane after undergoing a process step.
Figure 4:
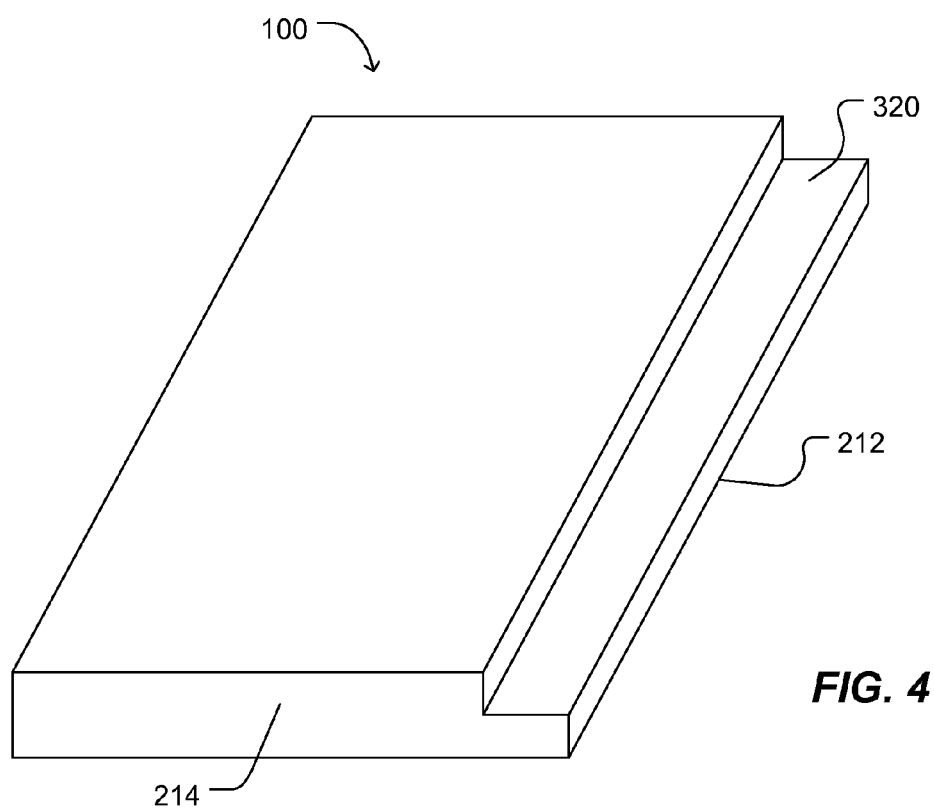

In a particular example, a strip of material of the roofing membrane 100 is removed along an edge, such as the longitudinal edge 212 of the roofing membrane 100. As illustrated in FIG. 3 and FIG. 4, a strip of material 314 is removed along the longitudinal edge 212 of the roofing membrane 100 to leave a flap 316. In particular, the strip 314 that is removed extends vertically through the first layer 102 and through at least a portion of the second layer 104. For example, the removal of the strip 314 includes removal of at least a portion 318 of the second layer 104 leaving an exposed portion 320 of layer 104. While the strip of material is illustrated in FIG. 4 as being removed from the longitudinal edge 212, alternatively, a strip of material can be removed from the latitudinal edge 214 or in a non-linear pattern along an edge 212 or 214 or at a hole in the roofing membrane 100 to accommodate, for example, a flashing.

In an example, the strip of material 314 is removed via mechanical methods including, for example, grinding, abrading, or skiving. For example, the strip of material 314 can be removed using an abrasive, such as an abrasive wheel or abrasive flap wheel, to abrade the first layer 102 and at least a portion 318 of the second layer. In another example, a grind wheel can be used to grind a strip of material 314 along the longitudinal edge 212 of the roofing membrane 100. In a further example, the strip of material 314 can be skived, such as through using a cutting tool, removing at least a portion of the second layer and the first layer.

In an example, the width of the exposed flap 316 is at least 1 centimeter, such as at least 2.5 centimeters, at least 4 centimeters, or even as high as 5 centimeters or higher. In particular, the width of the strip 314 and associated flap 316 is not greater than 10 centimeters. In a further example, the depth of the removed portion 318 is at least 50 micrometers, such as at least 100 micrometers. In particular, the depth of the removed portion 318 can be not greater than 255 micrometers. As a result, the depth of the flap 316 is in a range of 10 micrometers to 2 mm, such as a range of 500 micrometers to 2 mm.

In a particular example, mechanically removing the strip 314 provides a flap 316 that has a surface 322 that is roughened. For example, the surface roughness (Ra) of the surface 322 can be at least 1 micrometer, such as at least 2 micrometers, at least 4 micrometers, or even at least 10 micrometers. In general, the surface roughness is not greater than 500 micrometers.

In a particular example, the portion 314 of the membrane 100 is removed in the field away from a manufacturing facility. For example, the portion 314 can be mechanically removed just prior to installation. In another example, the membrane 100 can be secured to the surface of a structure prior to mechanically removing the portion 314.

Figure 5:
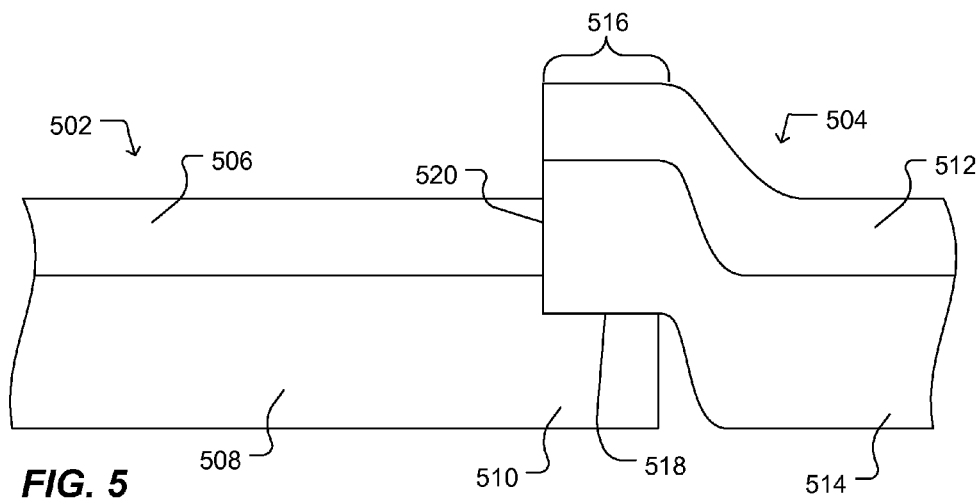
FIG. 5 includes an illustration of a joint between two membranes.

After the first membrane is installed, a second membrane can be installed to overlap at least the exposed flap of the first membrane. For example, FIG. 5 illustrates two membranes 502 and 504 installed such that the second membrane 504 overlaps the first membrane 502. The first membrane 502 includes a first layer 506 that is formed of a low surface energy polymer and includes a second layer 508 that can be formed of an elastomer. Similarly, the second membrane 504 includes a first layer 512 formed of a low surface energy polymer and a second layer 514 formed of an elastomer. In a region 516, the second membrane 504 overlaps the first membrane 502. In particular, the strip is removed from the first membrane 502 exposing a flap 510 with a roughened surface 518. In the overlapping region 516, the underside of layer 514 contacts the roughened surface 518 of the flap 510.

The second membrane 504 can be bonded to the first membrane 502. For example, an adhesive can be placed over the surface 518 of the flap 510 that adheres the second membrane 504 in the region 516 to the first membrane 502. In an example, the adhesive can be a thermoplastic adhesive and can melt bond the second membrane 504 to the first membrane 502. In an alternative embodiment, the layers 508 and 514 can be thermoplastic and can be thermally bonded together.

Figure 6:
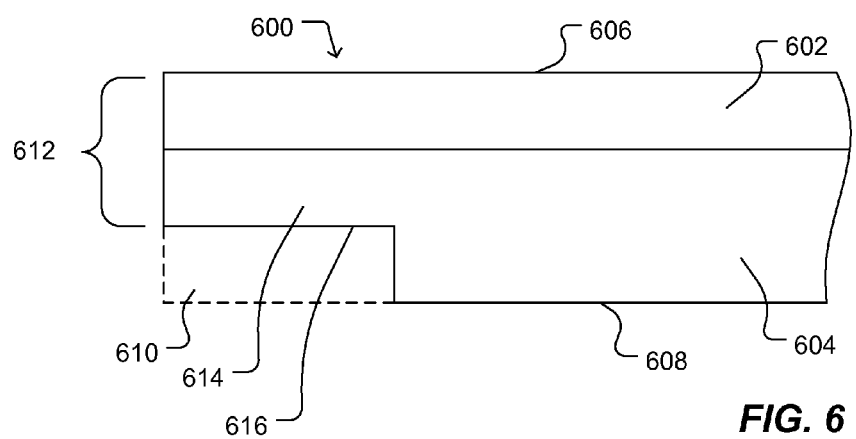
FIG. 6 includes an illustration of a roofing membrane after undergoing a process.

In a further embodiment, a strip of material can be removed from the roofing membrane along an opposite edge of the roofing membrane to the edge from which a strip of material was removed from the topside of the membrane. For example, FIG. 6 includes an illustration of a roofing membrane 600 from which a strip of material 610 has been removed from an undersurface of the roofing membrane 600. The roofing membrane 600 includes a layer 602 formed of a low surface energy material and the layer 604 underlying layer 602 can be formed of an elastomeric material. Layer 602 forms an upper surface 606 that once installed is exposed to the weather and layer 604 forms an underside surface 608 that is typically in contact with a surface of a structure.

As illustrated, a strip 610 has been removed from the under surface of the roofing membrane 600 along an edge that is opposite the edge from which a strip of material is removed from the topside of the roofing membrane. The strip of material includes a portion of the layer 604, leaving an exposed portion of the layer 614 and a roughened surface 616. As a result, a flap 612 remains that includes the first layer 602 and the portion 614 of the second layer 604.

Figure 7:
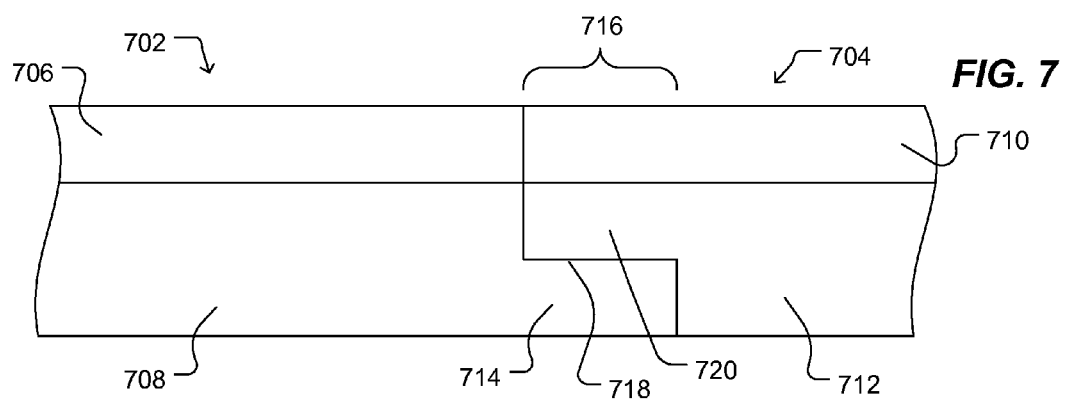
FIG. 7, FIG. 8, and FIG. 9 include illustrations of a joint between two roofing membranes.

When two adjacent membranes are installed, a first membrane from which an under surface strip has been removed can be installed to overlap with a second membrane from which a topside strip has been removed. As illustrated in FIG. 7, a first membrane 702 can be coupled to a second membrane 704. The first membrane includes a low surface energy material layer 706 overlying a layer 708, such as an elastomeric layer. Similarly, the roofing membrane 704 includes a low surface energy material layer 710 overlying an elastomeric material layer 712. As a result of a removal of a topside strip of material from the roofing membrane 702, a flap 714 remains formed of the second material layer 708. As a result of a removal of a strip of material from an underside of the roofing membrane 704, a strip of material 716 remains that includes a portion 720 of the elastomeric material layer 712. The flap 714 and the portion 720 of the material layer 712 contact at a surface 718 and are bonded. For example, an adhesive can be used to bond the portion 720 to the flap 714. In a particular example, the adhesive is a thermal adhesive, which can thermally bond or melt bond the first membrane 702 to the second membrane 704. In an alternative embodiment, the material layers 708 and 712 are thermoplastic and can be thermally bonded together through melting.

Figure 8:
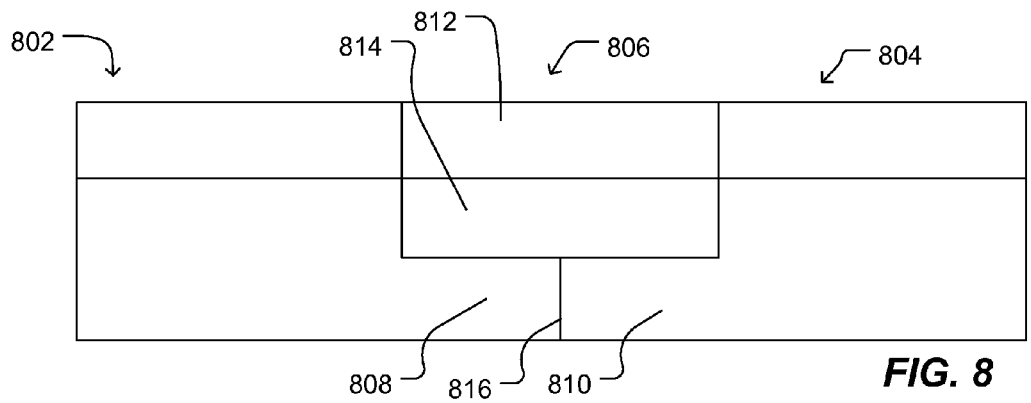

In a further embodiment illustrated in FIG. 8, material can be mechanically removed along a first edge of a first membrane 802 to leave a flap 808. In addition, material can be mechanically removed from a second edge of a second membrane 804 to leave a flap 810. The membranes 802 and 804 can be disposed on a surface of a structure so that flaps 808 and 810 abut at 816.

A seam cover 806 can be applied over flaps 808 and 810. In particular, the seam cover 806 can have a similar structure to that of the first and second membranes 802 and 804. For example, the seam cover 806 can have a two layer structure including an outer layer 812 formed of a low surface energy polymer and a second layer 814 formed of an elastomer, and in particular, a thermoplastic elastomer. The seam cover 806 can be thermally bonded to the flaps 808 and 810. Alternatively, the seam cover 806 maybe adhesively bonded to the flaps 808 and 810.

Figure 9:
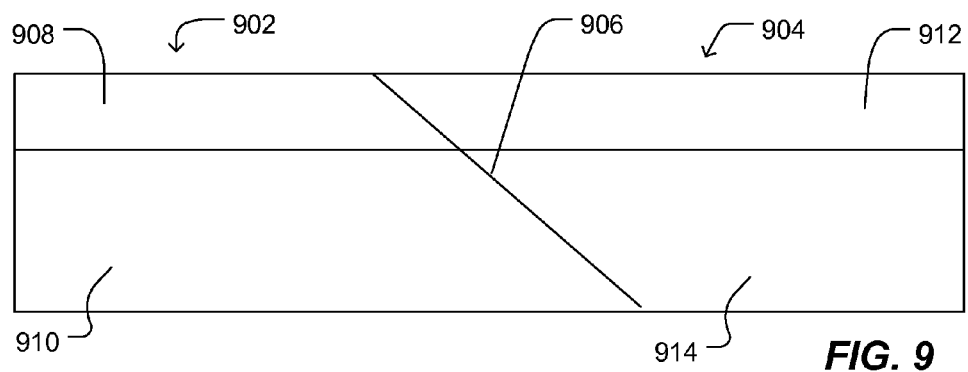

In an additional embodiment illustrated in FIG. 9, an edge of a first membrane 902 can be cut or skived at an angle. An edge of a second membrane 904 can be cut or skived at an angle supplementary to the edge of the first membrane 902. The membranes 902 and 904 can be disposed on the surface of structure to abut at 906 and can be bonded such as directly thermally bonded or bonded with an adhesive.

Figure 10:
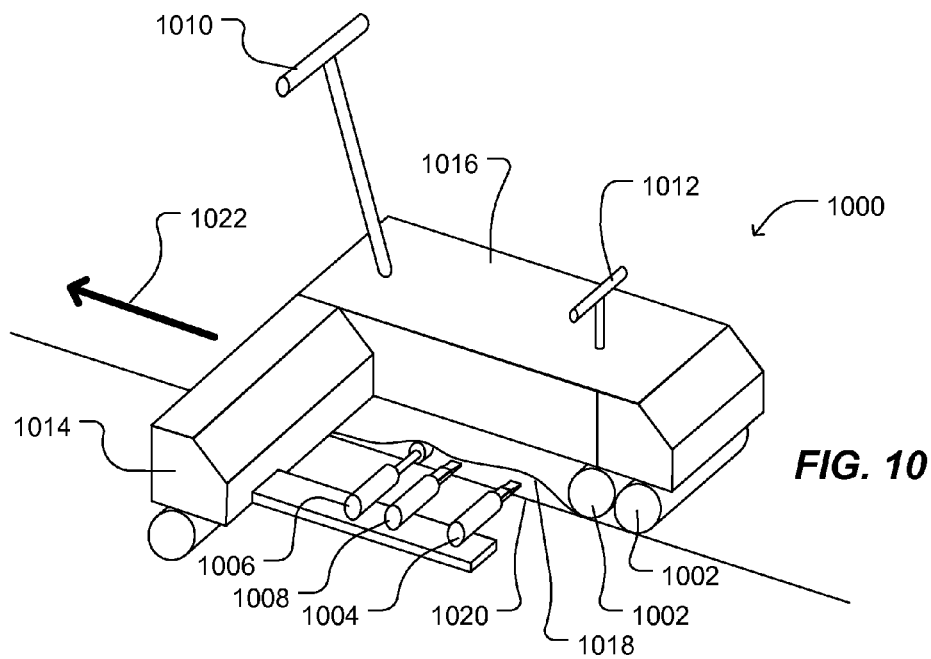
FIG. 10 includes an illustration of an exemplary welding tool.

In a particular embodiment, the membranes can be joined with the assistance of a welding tool. For example, a welding tool 1000, as illustrated in FIG. 10, can include one or more rollers 1002 and a heater 1004. The rollers 1002 can be rotatably coupled to a body 1016 of the welding tool 1000 and the heater 1004 can also be coupled to the welding tool 1000. In particular, the heater 1004 can be disposed to heat a seam of a roofing membrane in line with the rollers 1002. For example, the heater 1004 can be a hot air device that projects hot air at a temperature above the melting point of a layer of the roofing membrane or a melt adhesive disposed along the seam. The hot air is directed along the seam in the path of the rollers 1002, melting the layer or the melt adhesive prior to the rollers 1002 compressing the seam. In particular, the welding tool 1000 can move in a direction 1022 along the seam, resulting in the rollers 1002 pressing the seam together after the heater 1004 heats the seam.

In addition, the welding tool 1000 can include one or more abrasive tools 1006. The abrasive tools 1006 can be positioned to abrade a layer of at least one membrane along the seam. For example, the abrasive tools 1006 can be positioned to abrade at least a low surface energy layer of a bottom membrane 1020 and optionally to abrade a portion of an underside layer of the second membrane 1018. In a particular example, the abraded portions are disposed along the seam in line with the rollers 1002 prior to the heater 1004 such that abrasion occurs prior to heating of the seam. In an example, the abrasive tools 1006 can include a grind wheel or an abrasive flap wheel. Alternatively, the abrasive tool 1006 can be replaced with a cutting tool, such as a blade for skiving.

Further, the welding tool 1000 can include a blower or a vacuum 1008. Depending on the nature of the equipment, a blower 1008 can remove abraded particles prior to heating by blowing the particles from the seam. In another example, a vacuum 1008 can draw the particles from the seam after abrading and prior to heating. In particular, the vacuum can draw the particles from the seam and deposit the particles in a container (not illustrated).

In addition, the welding tool 1000 can include handles 1010 or 1012 to assist in guiding the welding tool 1000 along the seam of the roofing membranes. Further, the welding tool 1000 can also include a side carrier 1014 to which one or more of the abrasive tools 1006, blower or vacuum 1008, or heater 1004 are attached.

While the method can be implemented using an integrated welding tool, such as welding tool 1000, the method can alternatively be performed using separate tools and can be performed using hand held tools or manual tools. In particular, such tools can be used to perform the method along end edges and edges associated with flashing covers.

Figure 11:
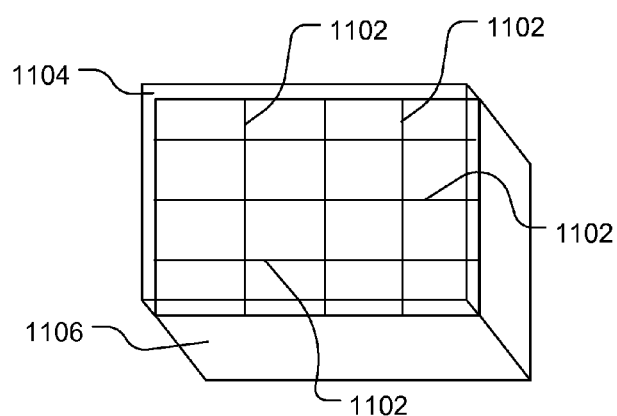
FIG. 11 includes an illustration of an exemplary roofing membrane.

As further illustrated in FIG. 11, the roofing membrane 1100 can be provided with an indicator 1102 to indicate an appropriate amount of abrading. For example, the indicator 1102 can be positioned between a top layer 1104 and an underlying layer 1106. When the top layer 1104 and at least a portion of the underlying layer 1106 are abraded, the indicator 1102 is also abraded and disappears. In a particular example, the indicator 1102 can include lines printed on the underlying layer 1106 prior to lamination of the top layer 1104 to the underlying layer 1106. The printing can include inks or pigments that are permanent or that fade quickly with exposure to sunlight or UV light. Alternatively, the indicator can be a colored layer underlying the layer 1106, such as a separate polymeric layer, elastomeric layer, or a colored adhesive layer.

Figure 12:
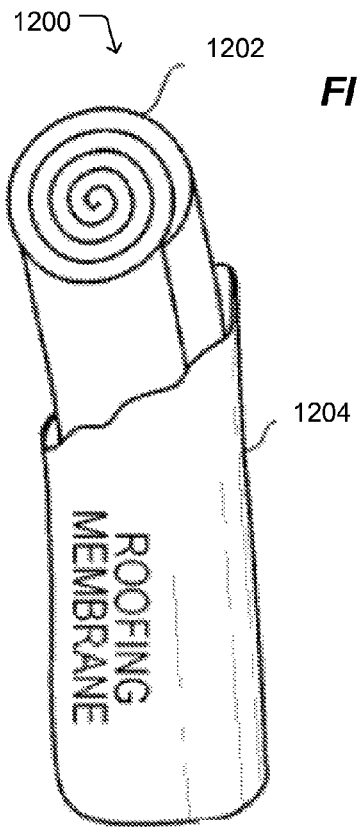
FIG. 12 includes an illustration of a merchandised article including a roofing membrane.

The rolls of film can be sold as a merchandised article, such as the merchandised article 1200 illustrated in FIG. 12. The merchandised article 1200 can include a roll of the roofing membrane 1202 and a mark indicating use of the membrane as a roofing material. For example, the merchandised article 1200 can include packaging 1204 having writing or markings indicating that the packaged roll 1202 is a roofing membrane. Alternatively, a marking or indicator, such as lettering, can be printed on the roll 1202. In a further exemplary embodiment, the marking or indicator can be a tag wrapped around the roll 1202 or attached to a band securing the roll 1202.

Figure 13:
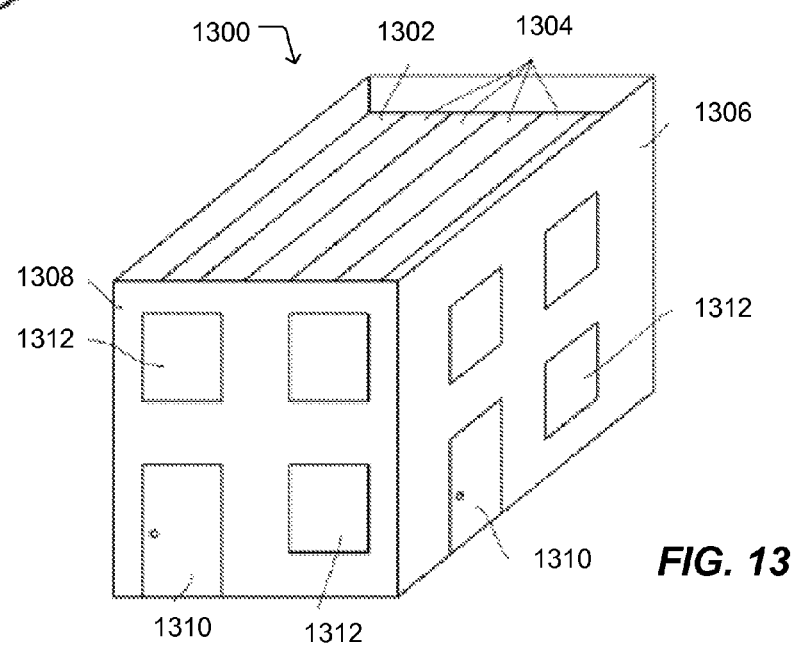
FIG. 13 includes an illustration of a structure upon which a roofing membrane can be installed.

The roofing material can be installed on a building, as illustrated at FIG. 13. For example, a building 1300 can include outdoor surfaces 1302, 1306 and 1308. In a particular example, the skyward facing surface 1302 is covered with a roofing membrane 1304. As illustrated, the skyward facing surface 1302 is a low slope surface. For example, a low slope surface can have a slope not greater than about 10°. Generally, low slope roofing is useful in large commercial buildings. In an alternative embodiment, the skyward facing surface 1302 can be a sloped roof. Generally, sloped roof systems are useful in residential structures.

While the membrane 1304 is illustrated in connection with the skyward facing surface 1302, the membrane 1304 also can be installed on vertical surfaces 1306 or 1308. Such vertical surfaces 1306 or 1308 can include windows 1312 and doors 1310. When installed on vertical surfaces, such as the surfaces 1306 and 1308, the multi-layer membrane is installed on regions of the surface that do not include the windows 1312 or the doors 1310.

A multi-layer membrane can be placed on a surface. For example, the surface can be a skyward facing surface of a commercial building. Such surfaces are typically low-slope roofs. However, the membrane can also be placed over a sloped roof, such as the roofs typically used in residential real estate. In a particular embodiment, the films are unrolled to form elongated sheets lying side by side over the roof.

The membrane can be secured to the surface. For example, the membrane can be secured to the roof using an adhesive. In a particular embodiment, the membrane can be secured using a hot tar or pitch as adhesive. The membrane can be placed over the hot tar of pitch and the hot tar or pitch allowed to cool. In an alternative embodiment, the membrane can be thermally secured to the surface. For example, the membrane can be heated to a softening or melting point and pressed onto the roof surface. In such a manner, thermal plastic portions of the multi-layer membrane can adhere to the roof. In another example, heating the membrane can activate thermal curing agents within the membrane, resulting in bonding of the membrane to the roof structure. In alternative embodiments, the membrane can be secured to the roof using a mechanical method such as nails, screws, or flushings.

EXAMPLES

An abrasive flap wheel attached to a Dremel tool is used to remove a fluoropolymer cap layer from a roofing membrane to expose a TPO underlayer. A series of lines drawn on the TPO roofing membrane prior to laminating the fluoropolymer cap layer serve to indicate when the fluoropolymer cap layer and at least a portion of the TPO underlayer is abraded away (i.e. once the lines are not visible, it implies that the cap layer has been removed and abrasion can be stopped). Subsequently, heat welding is conducted after the debris resulting from the abrasion step has been removed. Table 1 illustrates the seam strength values of the post abraded, unabraded samples, and TPO control.

TABLE 1

| | Seam Strength | |
|---|---|---|
| Samples | Seam Strength (N) | Mode of Failure |
| Post-Abraded* | 562.9 ± 13.6 | Cohesive Failure in TPO |
| Unabraded* | 230.6 ± 74.3 | Seam Failure |
| TPO Control | 614.3 ± 23.1 | Cohesive Failure in TPO |

Note:
Seam strength values are average of 5 samples*
Seam strength of TPO control is average of 3 samples Table 1 illustrates that the seam value of the post abraded sample is higher than the unabraded sample. More importantly, the post abraded samples exhibit a cohesive failure in the TPO, while the unabraded samples exhibit a failure at the seam. Accordingly, the flap wheel effectively removes the fluoropolymer cap layer and therefore yields higher seam strength.

In a particular embodiment, a roofing membrane includes first and second layers. The first layer includes a low surface energy polymer. A method of installing the roofing membrane includes, along an edge of a first membrane, mechanically removing a portion of the first membrane extending vertically to include the first layer and a portion of the second layer to leave a flap of the first membrane, placing an edge of a second membrane to overlap the first membrane, and bonding the first membrane to the second membrane. The underside of the edge of the second membrane overlies the flap of the first membrane.

In another embodiment, a method of installing a roofing membrane includes mechanically removing a strip portion of a first membrane along an edge of the first membrane. The first membrane has first and second layers. The first layer forms a low surface energy surface. The strip portion extends vertically through the first layer and a portion of the second layer to expose the second layer. The method further includes placing a portion of a second membrane extending along an edge of the second membrane to overlap the exposed second layer of the first membrane and bonding the second membrane to the first membrane.

In a further embodiment, a welding tool for joining first and second roofing membranes along a seam includes a roller to press the second roofing membrane against the first roofing membrane along the seam. Each of the first and second first roofing membranes has first and second layers. The first layer forms a low surface energy surface. The second layer includes a thermoplastic portion. The welding tool further includes a heater to heat the second layer of the first or second roofing membranes at a point along the seam in alignment with the roller. The welding tool also includes a mechanical abrading device to abrade a portion of the first layer of the first roofing membrane along the seam in alignment with the point to be heated.

In an additional embodiment, a method to form a seam between first and second roofing membrane, wherein each of the first and second roofing membrane has first and second layers, and wherein the first layer forms a low surface energy surface and the second layer includes a thermoplastic, includes abrading a portion of a first layer of the first roofing membrane with a mechanical abrading device of a welding tool to expose a portion of the second layer of the first roofing membrane along the seam, heating the exposed portion of the second layer of the first membrane or a second layer of the second membrane with a heater of the welding tool, and pressing the first and second roofing membranes together along the seam with a roller of the welding tool.

In another embodiment, a roofing membrane includes a first layer including a low surface energy polymer, a second layer bonded to the first layer and including a thermoplastic, and an indicator line disposed between the first layer and the second layer.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of installing a roofing membrane, the roofing membrane comprising first and second layers, the first layer including a low surface energy polymer, the method comprising:
along an edge of a first membrane, mechanically removing a portion of the first membrane extending through a thickness of the first membrane to include the first layer and a portion of the second layer to leave a flap of the first membrane;
placing an edge of a second membrane to overlap the first membrane, the underside of the edge of the second membrane overlying the flap of the first membrane; and
bonding the first membrane to the second membrane.

2. The method of claim 1, wherein mechanically removing includes grinding.

3. The method of claim 1, wherein mechanically removing includes abrading.

4. The method of claim 3, wherein abrading includes flap wheel abrading.

5. The method of claim 1, wherein mechanically removing includes skiving.

6. The method of claim 1, wherein bonding includes thermally bonding.

7. The method of claim 6, wherein thermally bonding includes hot air bonding.

8. The method of claim 6, wherein thermally bonding includes hot air bonding with an adhesive insert.

9. The method of claim 1, wherein the first membrane includes an indicator line disposed between the first layer and the second layer, and wherein mechanically removing includes mechanically removing the indicator line.

10. The method of claim 1, further comprising removing a second strip portion of the second membrane extending along an edge of the second membrane, the second strip portion extending vertically through a portion of the second layer from an under surface of the second membrane.

11. A method of installing a roofing membrane, the method comprising:
mechanically removing a strip portion of a first membrane along an edge of the first membrane, the first membrane having first and second layers, the first layer forming a low surface energy surface, the strip portion extending through a thickness of the first layer and a portion of the second layer to expose the second layer; and
placing a portion of a second membrane extending along an edge of the second membrane to overlap the exposed second layer of the first membrane; and
bonding the second membrane to the first membrane.

12. The method of claim 11, further comprising removing a second strip portion of the second membrane extending along the portion of the second membrane, the second strip portion extending vertically through a portion of the second layer from an under surface of the second membrane.

13. The method of claim 11, wherein mechanically removing includes grinding.

14. The method of claim 11, wherein mechanically removing includes abrading.

15. The method of claim 14, wherein abrading includes flap wheel abrading.

16. The method of claim 11, wherein mechanically removing includes skiving.

17. The method of claim 11, wherein bonding includes thermally bonding.

* * * * *